United States Patent [19]

Tanoue et al.

[11] Patent Number: 5,077,517
[45] Date of Patent: Dec. 31, 1991

[54] VOLTAGE FLUCTUATION AND HIGHER HARMONICS SUPPRESSOR

[75] Inventors: Yoshirou Tanoue; Fumio Aoyama, both of Tokyo, Japan

[73] Assignee: Kabushiki Kaisha Toshiba, Kawasaki, Japan

[21] Appl. No.: 622,602

[22] Filed: Dec. 5, 1990

[30] Foreign Application Priority Data

Dec. 8, 1989 [JP] Japan ................................ 1-317859

[51] Int. Cl.$^5$ ............................................... G05F 1/70
[52] U.S. Cl. ..................................... 323/207; 323/205
[58] Field of Search ................................ 323/205, 207

[56] References Cited

U.S. PATENT DOCUMENTS

| | | | |
|---|---|---|---|
| 3,932,799 | 1/1976 | Frank et al. | 323/207 |
| 4,009,433 | 2/1977 | Moltgen | 323/207 |
| 4,019,124 | 4/1977 | Moltgen | 323/207 |
| 4,719,551 | 1/1988 | Nishizawa et al. | 323/207 |
| 4,752,726 | 6/1988 | Aoyama | 323/207 |
| 4,812,669 | 3/1989 | Takeda et al. | 323/207 |
| 4,878,208 | 10/1989 | Seki et al. | 323/207 |
| 4,903,184 | 2/1990 | Hirose | 323/207 |
| 4,922,124 | 5/1990 | Seki et al. | 323/207 |

OTHER PUBLICATIONS

Akagi et al., "Generalized Theory of the Instantaneous Reactive Power and Its Applications", The Transactions of The Institute of Electrical Engineers of Japan, Jul. 1983, vol. 103-B, No. 7, pp. 483-490.

*Primary Examiner*—Steven L. Stephan
*Assistant Examiner*—Jeffrey Sterrett
*Attorney, Agent, or Firm*—Foley & Lardner

[57] ABSTRACT

A device for suppressing voltage fluctuation and higher harmonics of a power system which supplies power to a load with large power fluctuation and higher harmonic current. The device includes a self-commutated converter and a higher harmonic filter, both provided in parallel with the load. The device includes a first calculation circuit which calculates a reactive power consumed by the load based on a load current and system voltage and generates a fundamental harmonic current command value to compensate the reactive power. The device further includes a second calculation circuit which detects a higher harmonic current flowing out to the power system based on a current flowing from the power system and generates a higher harmonic current command value to suppress the higher harmonic current. The device further includes an adder which adds the fundamental harmonic current command value and the higher harmonic current command value to generate a current command value of the self-commutated converter. The device includes a control circuit which receive the current command value for controlling the self-commutated converter.

5 Claims, 5 Drawing Sheets

VOLTAGE FLUCTUATION AND HIGHER HARMONICS SUPPRESSOR

BACKGROUND OF THE INVENTION

1. Field of the Invention

This invention relates to a device for suppressing voltage fluctuation and higher harmonics of the power system that are generated due to power fluctuation of the load with a large amount of power fluctuation and higher harmonic current.

2. Description of the Related Art

Conventionally, when suppressing voltage fluctuations of a power system generated from a load with irregular fluctuations of reactive power and large capacity, such as an arc furnace, it has been the practice to control the reactive power of a voltage fluctuation suppression device, which was provided in parallel with the load in order to compensate for these fluctuations of reactive power, by detecting the reactive power consumed by the load.

Figure 4:
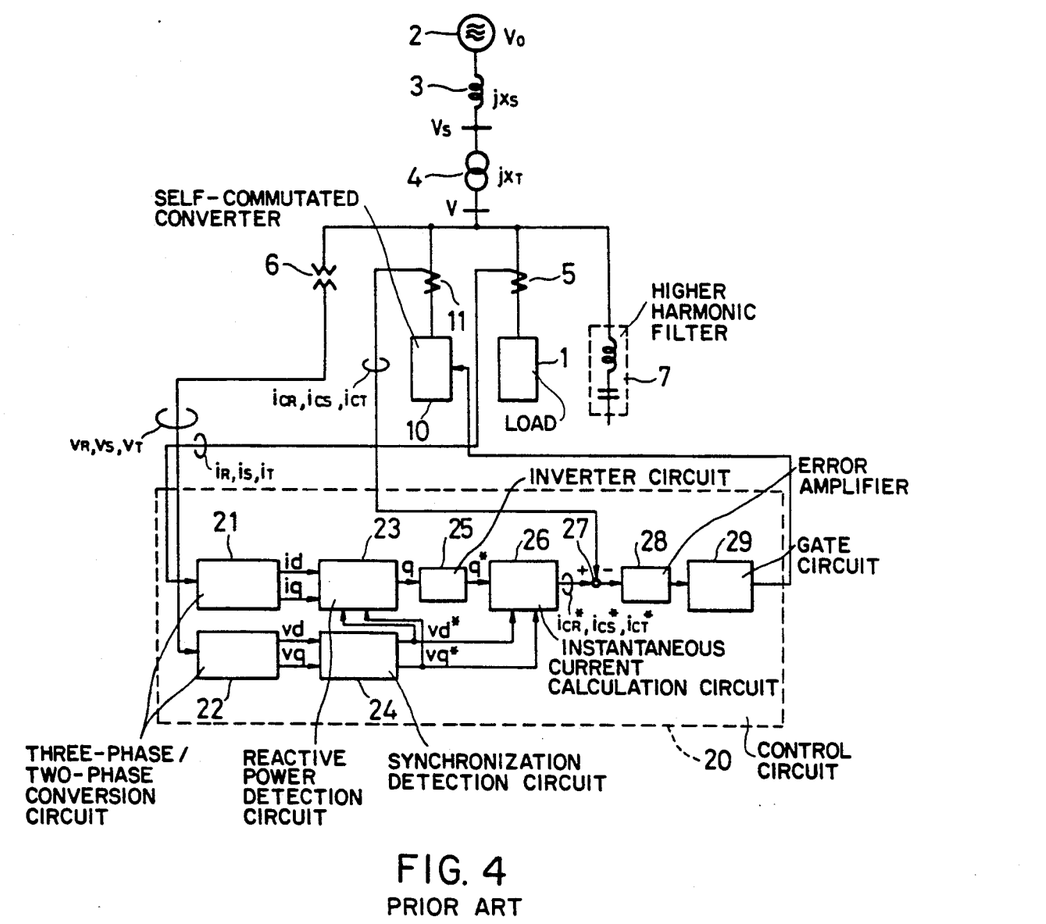
FIG. 4 is a circuit layout diagram showing a conventional device for suppressing voltage fluctuation and higher harmonics.
Figure 5:
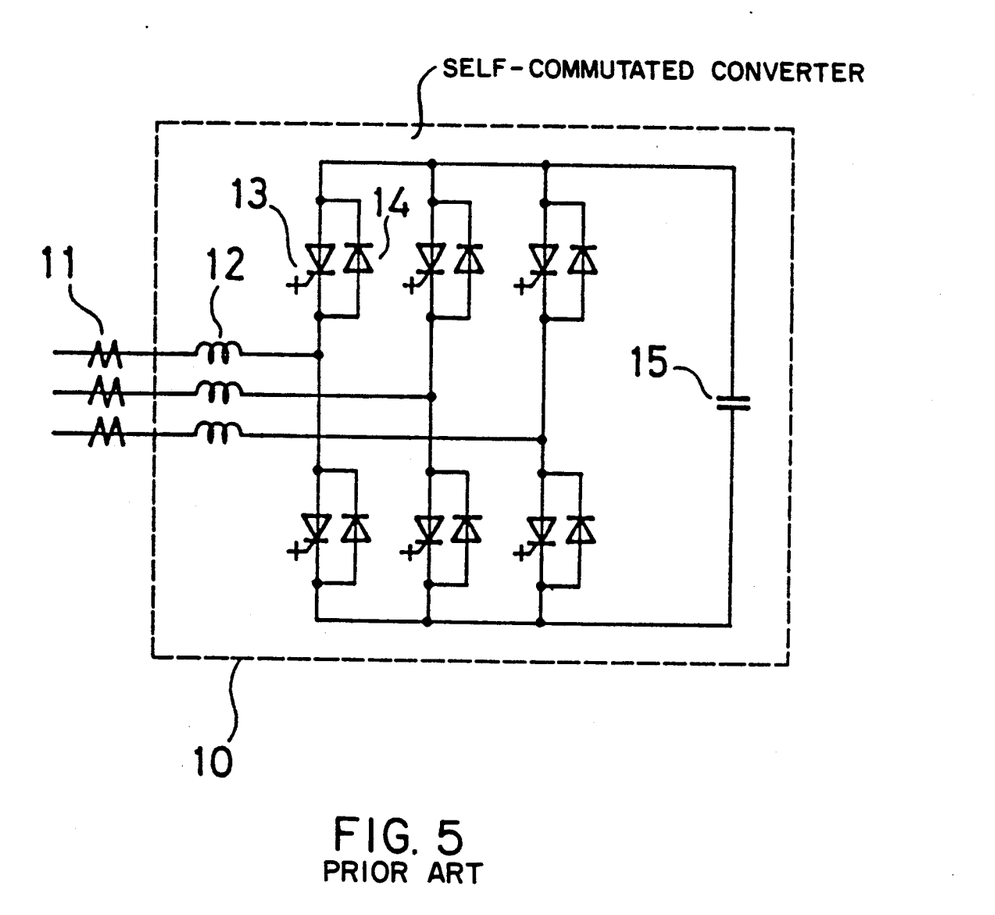
FIG. 5 is a detailed diagram of the self-commutated converter shown in FIG. 4.

FIG. 4 shows a circuit layout of a conventional voltage fluctuation suppression device, which is disclosed, for example, in U.S. Pat. No. 4,752,726 (June 21, 1988). In FIG. 4, to avoid complicating the drawing, the three-phase system is shown as a single line connection diagram. In FIG. 4, power is fed to a load 1 from a power source 2 through a transmission line 3 (asssumed to be of impedance jXs) and a receiving transformer 4 (assumed to be of impedance jXt). A voltage fluctuation suppression device constituted by a self-commutated converter 10 is provided in parallel with the load 1. This includes a control circuit 20 wherein the reactive power is calculated from the current and voltage detected by a current transformer 5 and a voltage detection transformer 6, and a current to compensate for the reactive power is supplied. As shown in FIG. 5, the self-commutated converter 10 includes ac reactors 12, gate turn-off thyristors (GTO) 13, diodes 14, and a dc capacitor 15. The current of the load 1 detected by the current transformer 5 is the line current of the three-phase circuit and is converted to the two-phase ac by a three-phase/two-phase conversion circuit 21. This process can be represented by the following equation, where $i_R$, $i_S$ and $i_T$ are the respective line currents of the three-phase ac, and $i_d$ and $i_q$ are the currents of the two-phase ac.

$$\begin{bmatrix} i_d \\ i_q \end{bmatrix} = \sqrt{2/3} \begin{bmatrix} 1 & -1/2 & -1/2 \\ 0 & \sqrt{3/2} & -\sqrt{3/2} \end{bmatrix} \begin{bmatrix} i_R \\ i_S \\ i_T \end{bmatrix} \quad (1)$$

In the same way, the circuit voltages $v_R$, $v_S$, $v_T$ are detected by the voltage detection transformer 6, and converted to the two-phase ac by a three-phase/two-phase conversion circuit 22. The expression representing this conversion is the same as equation (1), substituting v for i.

$$\begin{bmatrix} v_d \\ v_q \end{bmatrix} = \sqrt{2/3} \begin{bmatrix} 1 & -1/2 & -1/2 \\ 0 & \sqrt{3/2} & -\sqrt{3/2} \end{bmatrix} \begin{bmatrix} v_R \\ v_S \\ v_T \end{bmatrix} \quad (2)$$

The voltage signals $v_d$ and $v_q$ obtained by this two-phase conversion are converted by a synchronization detection circuit 24 into synchronized voltage signals $v_d^*$, $v_q^*$ synchronized with the fundamental component. A reactive power detection circuit 23 detects the so-called instantaneous real power and instantaneous imaginary power, as defined in Article No. 58-B60, P. 41 to 48 of Denki Gakkai-Shi Ronbun (The Journal of the Electrical Association of Japan) "Generalized Theory of Instantaneous Reactive Power and its Application". These are found by calculation by the following expression:

$$\begin{bmatrix} p \\ q \end{bmatrix} = \begin{bmatrix} i_d & i_q \\ i_q & -i_d \end{bmatrix} \begin{bmatrix} v_d^* \\ v_q^* \end{bmatrix} \quad (3)$$

where p is the instantaneous real power and q is the instantaneous imaginary power. In the two-phase ac, $v_d^*$ and $v_q^*$ are orthogonal components of magnitude 1 pu, and v approximately equals $v_d^*$ and vq approximately equals $v_q^*$. p is therefore the instantaneous active power supplied from the power source 2 to the load 1, and q is the instantaneous reactive power circulating between the two phases.

Also in the power system, the magnitude of the voltage fluctuations due to reactive power is dominant, and the fluctuations due to active power can be neglected. The self-commutated converter 10 need therefore only compensate q. The compensation amounts q* can therefore be obtained by an inverter circuit 25 by inverting q* the sign of q, as $$q^* = -q \quad (4)$$

An instantaneous current calculation circuit 26 calculates the respective line current command values $i_{CR}^*$, $i_{CS}^*$ and $i_{CT}^*$ to make the self-commutated converter 10 act as a current source. These are found by inverse conversion of expression (3) and expression (1). Taking the command values in the two-phase ac as $i_{cd}^*$ and $i_{cq}^*$, these are given by:

$$\begin{bmatrix} i_{cd}^* \\ i_{cq}^* \end{bmatrix} = \begin{bmatrix} v_d^* & -v_q^* \\ v_q^* & -v_d^* \end{bmatrix} \begin{bmatrix} p^* \\ q^* \end{bmatrix} \quad (5)$$

$$\begin{bmatrix} i_{CR}^* \\ i_{CS}^* \\ i_{CT}^* \end{bmatrix} = \sqrt{2/3} \begin{bmatrix} 1 & 0 \\ -1/2 & \sqrt{3/2} \\ -1/2 & -\sqrt{3/2} \end{bmatrix} \begin{bmatrix} i_{cd}^* \\ i_{cq}^* \end{bmatrix} \quad (6)$$

Since, for the reasons discussed above, p*=0, we have:

$$\begin{bmatrix} i_{CR}^* \\ i_{CS}^* \\ i_{CT}^* \end{bmatrix} = \sqrt{2/3} \begin{bmatrix} 1 & 0 \\ -1/2 & \sqrt{3/2} \\ -1/2 & -\sqrt{3/2} \end{bmatrix} \begin{bmatrix} v_q^* & q^* \\ v_d^* & q^* \end{bmatrix} \quad (7)$$

An calculation circuit 27 calculates the differences between the respective currents $i_{CR}$, $i_{CS}$ and $i_{CT}$ of the self-commutated converter 10 detected by the current transformer 11 and the command values found from the above equation. An error amplifier 28 uses these differences to perform constant-current control, tracking the command values of the converter 10. The outputs of the error amplifier 28 are input to an gate circuit 29, generating on/off pulses for PWM control of the converter 10, these pulses being applied to the gates of GTOs 13 shown in FIG. 5. Since this self-commutated converter 10 is of the voltage type, the dc capacitor 15 is needed to make the dc voltage constant. An ac reactor 12 performs the action of smoothing the pulse-width modulated voltage and converting it to a current.

While voltage fluctuations are controlled as above, a higher harmonic filter 7 consisting of a reactor and a capacitor is provided in order to suppress higher harmonics generated by the load 1. Such a filter is a so-called single harmonic tuning type passive filter, so a group of higher harmonic filters are constituted by providing one or more higher harmonic filters for the higher harmonics of each order.

Thus, in a conventional device for suppressing voltage fluctuation and higher harmonics, higher harmonic filters were used as higher harmonic suppression means. However, such a higher harmonic filter cannot suppress all higher harmonics, it cannot suppress higher harmonics corresponding to the antiresonance frequency determined by the constant of the higher harmonic filter and the reactance Xs of transmission line. In particular in the case of an arc furnace, when the higher harmonics vary steeply and irregularly, the higher harmonics cannot be suppressed by the higher harmonic filter, and may in fact be increased.

The voltage fluctuation and higher harmonic suppression device as shown in FIG. 4 wherein the higher harmonic filter 7 and the self-commutated converter 10 are connected in parallel to the load 1 has in principle the capability of suppressing higher harmonics. But, since its control is performed using an open loop, if there is some control error, higher harmonics may be increased by the phenomenon described above, or at any rate sufficient benefit is not obtained.

Also, if one attempts to suppress all the higher harmonics generated by the load 1 by means of self-commutated converter 10, the higher harmonic filter 7 ends up simply having the function of a static capacitor, and the capacity of the self-commutated converter 10 itself becomes large, which is uneconomic.

SUMMARY OF THE INVENTION

Accordingly, one object of this invention is to provide a voltage fluctuation and higher harmonic suppression device which exhibits a good suppressing effect in respect of higher harmonics corresponding to the antiresonance frequency or higher harmonics which change with time, and which is economically advantageous.

These and other objects of this invention can be achieved by providing a device for suppressing voltage fluctuation and higher harmonics of a power system which supplies power to a load with larger power fluctuation and higher harmonic current.

The device includes a self-commutated converter and a higher harmonic filter, both provided in parallel with the load. The device further includes a first and a second calculation circuits. The first calculation circuit receives a load current flowing through the load and a system voltage of the power system and calculates a reactive power consumed by the load based on the load current and the system voltage and generates a fundamental harmonic current command value to compensate the reactive power.

The second calculating circuit receives a current flowing from the power system and detects a higher harmonic current flowing out to the power system and generates a higher harmonic current command value to suppress the higher harmonic current.

The device further includes an adder circuit for adding the fundamental harmonic current command value and the higher harmonic current command value to generate a current command value of the self-commutated converter. The device further includes a control circuit connected to receive the current command value for controlling the self-commutated converter based on the current command value. The device can suppress the voltage fluctuation and higher harmonics of the power system.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
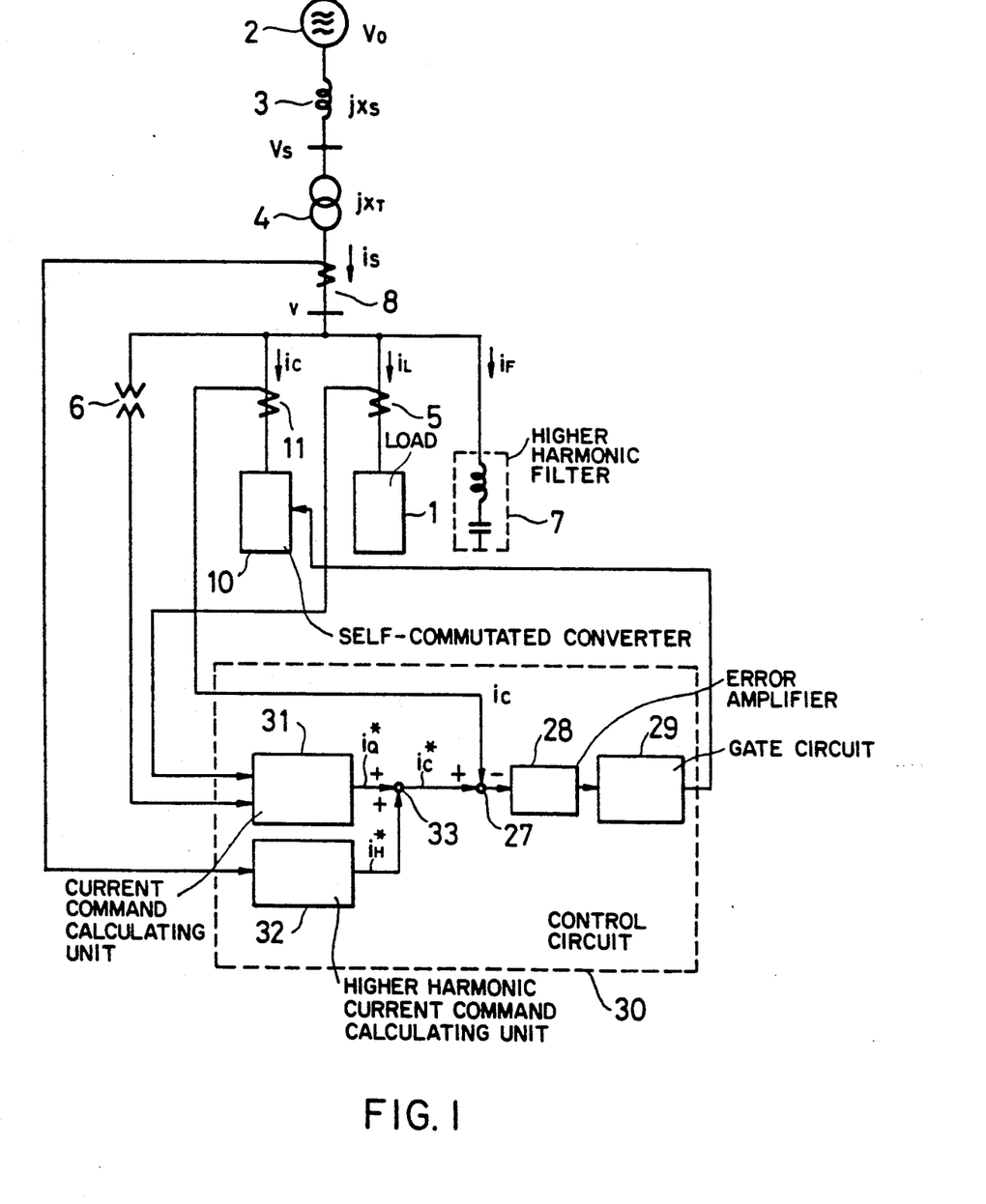
FIG. 1 is a circuit diagram showing a schematic layout of a device for suppressing voltage fluctuation and higher harmonics according to this invention.

Referring now to the drawings, wherein like reference numerals designate identical or corresponding parts throughout the several views, the embodiments of this invention will be described below. FIG. 1 is a circuit diagram showing schematically an example of the layout of a suppression device for voltage fluctuation and higher harmonics according to the invention. Apart from the control circuit, the system layout is the same as that of FIG. 4. Corresponding parts are therefore given the same reference numerals and a description of them is omitted.

In this invention, as shown in FIG. 1, a control circuit 30 of the self-commutated converter 10 is equipped with a current command calculating unit 31 that inputs the load current $i_L$ detected by the current transformer 5 and the system voltage v detected by the transformer 6 and finds a current command value $i_Q^*$ for suppressing reactive power fluctuation of the load 1 or fundamental negative phase sequence current. The control circuit 30 also includes a higher harmonic current command calculating unit 32 that inputs current $i_S$ flowing in the power system 2 detected by the current transformer 8 and finds a higher harmonic current command value $i_H^*$ for controlling high harmonics flowing out to the power system 2, and an adder 33 that adds the current command value $i_Q^*$ found by the current command calculating unit 31 and the higher harmonic current command value $i_H^*$ found by the higher harmonic current command calculating units 32. The control circuit 30 is constituted such that the current $i_C$ flowing in the self-commutated converter 10 is controlled through the error amplifier 28 and the gate circuit 29 in response to the deviation calculated by the calculation circuit 27 between the sum $i_C^*$ of these two current command values added by the adder 33 and the current $i_C$ in self-commutated converter 10 detected by the current transformer 11.

In the above construction, the current command calculating unit 31 calculates the reactive power consumed by the load 1 from the load current $i_L$ and the system voltage v, and also calculates the fundamental harmonic current command value $i_Q^*$ necessary to compensate for the reactive power. If required, a signal to compensate for the fundamental negative phase sequence current of the load 1 can be added to the fundamental harmonic current command value $i_Q^*$. The higher harmonic current command calculating unit 32 detects the higher harmonic current from the power source current $i_S$, and calculates the higher harmonic current command value $i_H^*$ necessary to suppress the higher harmonic current. These current command values are added by the adder 33, to obtain the current command value $i_C^*$ of self-commutated converter 10.

The self-commutated converter 10 is therefore controlled by the calculation circuit 27, the error amplifier 28 and gate circuit 29 in the same way as conventionally, so that a current flows tracking current command value $i_C^*$.

Hereinafter an embodiment of this invention will be described with reference to FIG. 2, parts which are the same as in FIG. 1 and FIG. 4 are given the same reference numerals and a description of them is omitted. The details of a control circuit 30A including a current command calculation unit 31A and the higher harmonic current command calculation unit 32 will now be described.

In the embodiment shown in FIG. 2, the current command calculation unit 31A is constructed as follows. The fundamental harmonic reactive power $Q_L$ is detected by using a filter 34 to filter the instantaneous imaginary power q which is output by the reactive power detection circuit 23. A coefficient circuit 35 multiplies the fundamental harmonic reactive power $Q_L$ by a coefficient $(-K_Q)$ to find a reactive power command value $Q_L^*$. The reactive power command value $Q_L^*$ is applied to the instantaneous current calculation circuit 26, which converts it to a current command value $i_Q^*$.

Namely, in the instantaneous current calculation circuit 26 respective current command values $i_{QR}^*$, $i_{QS}^*$ and $i_{QT}^*$ of the current command value $i_Q^*$ are calculated as the following equation (8).

$$\begin{bmatrix} i_{QR}^* \\ i_{QS}^* \\ i_{QT}^* \end{bmatrix} = \sqrt{2/3} \begin{bmatrix} 1 & 0 \\ -1/2 & \sqrt{3/2} \\ -1/2 & -\sqrt{3/2} \end{bmatrix} \begin{bmatrix} v_q^* & Q_L^* \\ v_d^* & Q_L^* \end{bmatrix} \tag{8}$$

In the higher harmonic current command calculation unit 32, a higher harmonic current $i_H$ is detected by applying to a filter 43 the current $i_S$ of the power system detected by the current transformer 8. The higher harmonic current $i_H$ is then multiplied by a coefficient $(-K_H)$ by a coefficient circuit 44, to find a higher harmonic current command value $i_H^*$.

The current command value $i_C^*$ of the self-commutated converter 10 is obtained by combining, using the adder 33, the current command value $i_Q^*$ and the higher harmonic current command value $i_H^*$ found by the current command calculating unit 31 and the higher harmonic current command calculating unit 32.

In the embodiment, the construction of the filters 34 and 43 are well known to those skilled in the art, so the detailed description of the construction is omitted. The coefficient $(-K_Q)$ of the coefficient circuit 35 can be decided based on the capacity of the self-commutated converter 10 and the maximum reactive power $Q_{Lmax}$ of the load 1. The coefficient $(-K_H)$ of the coefficient circuit 44 can be decided based on the capacity of the self-commutated converter 10 and the maximum value of the higher harmonics generated by the load 1. But as the decision of the coefficients $(-K_Q)$ and $(-K_H)$ is clear to those skilled in the art, detailed description thereof is omitted.

The voltage fluctuations produced by the load fluctuations and the higher harmonics emitted by the power system 2 are therefore suppressed by controlling the self-commutated converter 10 by means of the calculation circuit 27, the error amplifier 28 and the gate circuit 29 in accordance with the deviation between the current command value $i_C^*$ and the current $i_C$ flowing in the self-commutated converter 10.

Thus, in this embodiment, the reactive power fluctuations of the load 1 can be rapidly controlled by open-loop control, so the voltage fluctuations produced by the reactive power fluctuations can be suppressed very effectively. Also, the higher harmonics that flow from the load 1 to the power system 2 are suppressed by closed loop control, so higher harmonics of the antiresonance frequency produced by the constant of the higher harmonic filter 7 and reactance of the transmission line 3 can be suppressed, and the phenomenon of the higher harmonic filter 7 producing increase in higher harmonics can be eliminated. A good higher harmonic suppression effect is therefore obtained.

Next, another embodiment of this invention will be described with reference to FIG. 3. Parts which are the same as in FIG. 2 and FIG. 4 are given the same reference numerals and a description of them is omitted, only the points of difference will be explained.

Figure 2:
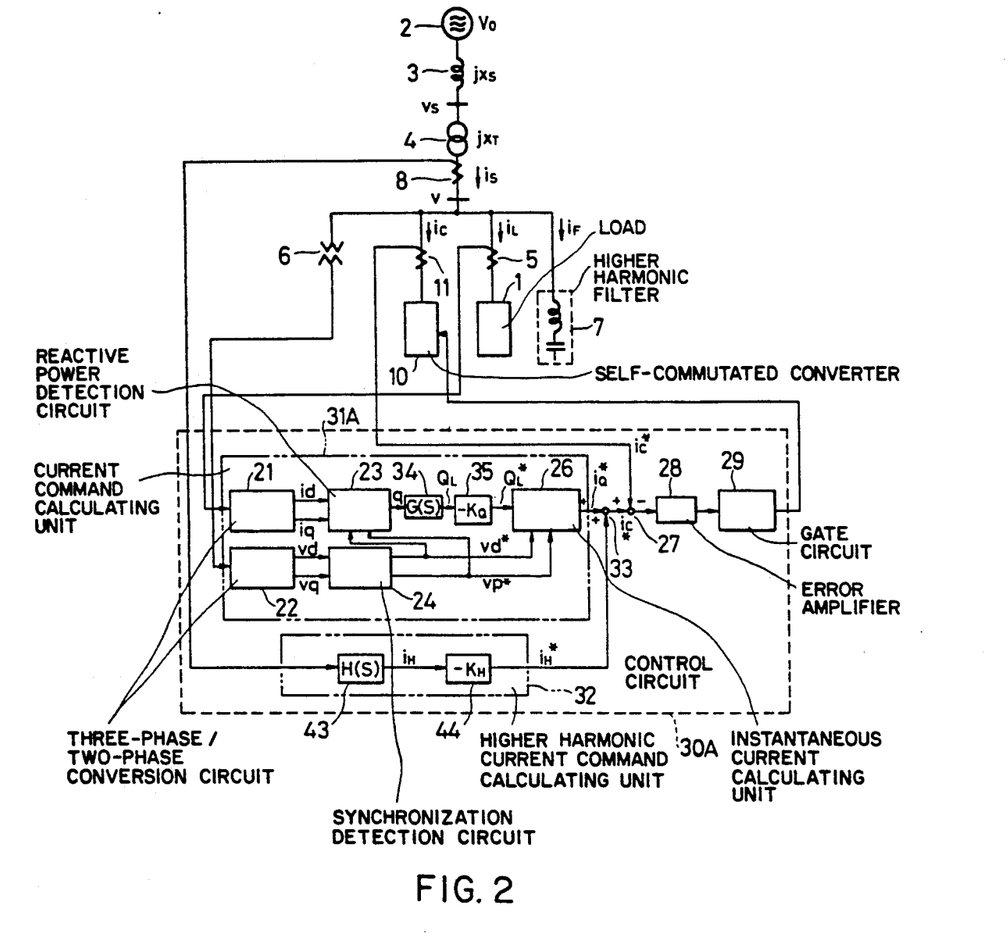
FIG. 2 is a circuit layout diagram showing an embodiment of this invention.
Figure 3:
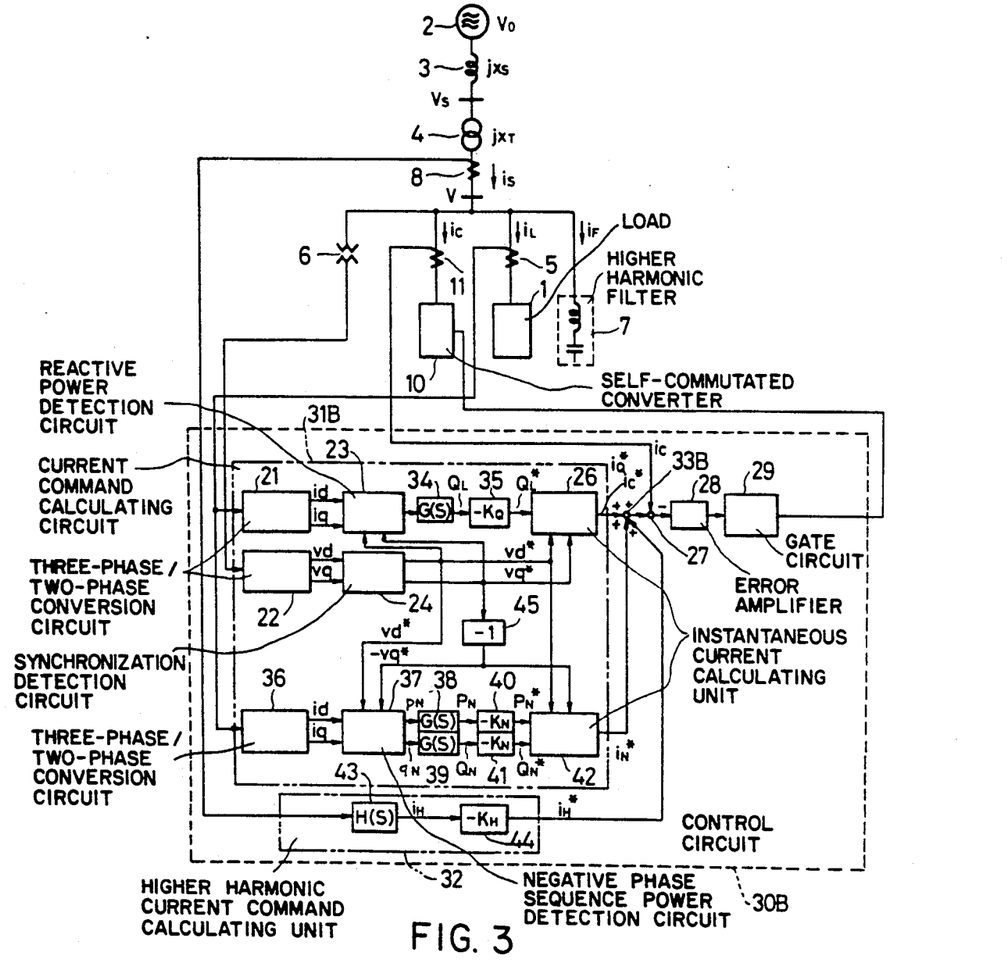
FIG. 3 is a circuit layout diagram showing another embodiment of this invention.

In a control circuit 30B according to the embodiment shown in FIG. 3, as a current command calculating unit 31B, in addition to the reactive power calculating system in the current command calculating unit 31A of FIG. 2, there is provided an negative phase sequence power calculating system. Specifically, in FIG. 3, the load current $i_L$ detected by the current transformer 5 is converted to two-phase ac by a three-phase/two-phase conversion circuit 36, as in the circuit 21, and the two-phase ac currents $i_d$ and $i_q$ are supplied to a negative phase sequence power detection circuit 37, where the negative phase sequence power is detected. In this case in the negative phase sequence power detection circuit 37, a calculation is performed in the equation (3) whereby $v_q^*$ is inverted (multiplied by $-1$), namely in the following equation (9)

$$\begin{bmatrix} p_N \\ q_N \end{bmatrix} = \begin{bmatrix} i_d & i_q \\ i_q & -i_d \end{bmatrix} \begin{bmatrix} v_d^* \\ -v_q^* \end{bmatrix} \tag{9}$$

where $p_N$ and $q_N$ are the outputs of the negative phase sequence power detection circuit 37. The $-v_1^*$ employed in this calculation is obtained by inverting the output $v_q^*$ of the synchronous detection circuit 24 by means of an inverter circuit 45. The fundamental harmonic positive phase sequence and negative phase sequence powers constituting the output of the negative phase sequence power detection circuit 37 are detected as ac of a frequency multiple of the fundamental frequency and as dc, respectively. The fundamental harmonic negative phase sequence powers $P_N$ and $Q_N$ are therefore obtained by filtering these outputs $p_N$ and $q_N$ through filters 38 and 39. Negative phase sequence power command values $P_N^*$ and $Q_N^*$ are found by multiplying these fundamental harmonic negative phase sequence powers $P_N$ and $Q_N$ by a coefficient $(-K_N)$ using coefficient circuits 40 and 41, and are applied to an instantaneous current calculating circuit 42, where they are converted into a negative phase sequence current command value $i_N^*$. Namely, in the instantaneous current calculating circuit 42, respective current command values $i_{NR}^*$, $i_{NS}^*$ and $i_{NT}^*$ of the negative phase power command values $i_N^*$ are calculated as the following equation (10).

$$\begin{bmatrix} i_{NR}^* \\ i_{NS}^* \\ i_{NT}^* \end{bmatrix} = \sqrt{2/3} \begin{bmatrix} 1 & 0 \\ -1/2 & \sqrt{3/2} \\ -1/2 & -\sqrt{3/2} \end{bmatrix} \begin{bmatrix} v_d^* & -v_q^* \\ v_q^* & -v_d^* \end{bmatrix} \begin{bmatrix} P_N \\ Q_N \end{bmatrix} \quad (10)$$

The negative phase sequence current command value $i_N^*$ is then combined with the current command value $i_Q^*$ mentioned above and the higher harmonic current command value $i_H^*$ by an adder 33B, and output as the current command value $i_C^*$ of the self-commutated converter 10.

In the embodiment, the construction of the filters 39 and 43 are well known to those skilled in the art, so the detailed description thereof is omitted. The coefficient $(-K_N)$ of the coefficient circuits 40 and 41 can be decided based on the capacity of the self-commutated converter 10 and square root of $(P_N^2 + Q_N^2)$. But as the decision of the coefficient $(-K_N)$ is clear to those skilled in the art, detailed description thereof is omitted.

In the embodiment, the three-phase/two-phase conversion circuit 36 is provided separately from the three-phase/two-phase conversion circuit 21. But the three-phase/two-phase conversion circuit 36 may be omitted. In this case, the outputs $i_d$ and $i_q$ of the three-phase/two-phase conversion circuit 21 are applied to the inputs of the negative phase sequence power detection circuit 37. Contrary, the three-phase/two-phase conversion circuit and the synchronization detection circuit may be provided for negative phase sequence power detection, separately from the three-phase/two-phase conversion circuit 22 and the synchronization detection circuit 24.

Thus, the current command calculating unit 31B has a powerful suppressing effect not only on fluctuations of reactive power of the load, but also on fluctuations of negative phase sequence current, owing to the open-loop control. Its effect in suppressing higher harmonics is the same as the embodiment of FIG. 2.

As described above, with this invention, the following benefits are obtained.

(1) The invention is highly effective against even steep voltage fluctuations, since the voltage fluctuations produced by load fluctuation are suppressed by open loop control.

(2) Fluctuating higher harmonics can also be suppressed since there is no antiresonance frequency as there is in the case of the conventional higher harmonic filter, since higher harmonics are supressed by closed loop control.

(3) There is an economic advantage in that the capacity of the self-commutated converter can be reduced because higher harmonics which do not change with time are absorbed by a higher harmonic filter, and only the remaining higher harmonics emitted to the power source are suppressed by the self-commutated converter.

Obviously, numerous modifications and variations of the present invention are possible in light of the above teachings. It is therefore to be understood that within the scope of the appended claims, the invention may be practiced otherwise than as specifically described herein.

What is claimed is:

1. A device for suppressing voltage fluctuation and higher harmonics of a power system which supplies power to a load with large power fluctuation and higher harmonic current, said device comprising:

a self-commutated converter provided in parallel with said load;

a higher harmonic filter provided in parallel with said load;

first calculation means connected to receive a load current flowing through said load and a system voltage of said power system for calculating a reactive power consumed by said load based on said load current and said system voltage and for generating a fundamental harmonic current command value to compensate said reactive power;

second calculation means connected to receive a current flowing from said power system for detecting a higher harmonic current flowing out to said power system and for generating a higher harmonic current command value to suppress said higher harmonic current;

adder means connected to said first and second calculation means for adding said fundamental harmonic current command value and said higher harmonic current command value to generate a current command value of said self-commutated convertion; and control means connected to receive said current command value for controlling said self-commutate converter based on said current command value;

thereby suppressing said voltage fluctuation and higher harmonics of said power system.

2. The device according to claim 1, wherein said first calculation means includes, a first three-phase/two-phase conversion circuit connected to receive said load current for converting three phase currents of said load current into two phase currents;

a second three-phase/two-phase conversion circuit connected to receive said system voltage for converting three phase voltages of said system voltage into two phase voltages;

a synchronization detection circuit connected to receive said two phase voltages for generating synchronized voltage signals synchronized with the fundamental component of said two phase voltages;

a reactive power detection circuit connected to receive said two phase currents and said synchronized voltage signals for generating reactive power of said load;

a first filter connected to receive said reactive power for filtering said reactive power to produce a fundamental harmonic reactive power;

a first coefficient circuit for multiplying said fundamental harmonic reactive power by a first coefficient to generate a reactive power command value; and a first instantaneous current calculation circuit connected to said reactive power command value and said synchronized voltage signals for generating said fundamental harmonic current command value based on said reactive power command value and said synchronized voltage signals.

3. The device according to claim 1, wherein said second calculation means includes, a first filter connected to receive said current flowing from said power system for filtering said current to produce a higher harmonic current; and a first coefficient circuit for multiplying said higher harmonic current by a first coefficient to produce said higher harmonic current command value.

4. The device according to claim 1, further comprising:

third calculation means connected to receive said load current and said system voltage for calculating a fundamental harmonic negative phase sequence power of said load based on said load current and for generating a negative phase sequence current command value to compensate a fundamental harmonic negative phase sequence current; and wherein said adder means is further connected to said third calculation means for adding said fundamental harmonic current command value, said higher harmonic current command value and said negative phase sequence current command value to generate said current command value;

thereby further suppressing said fundamental harmonic negative phase sequence current.

5. The device according to claim 4, wherein said third calculation means includes, a first three-phase/two-phase conversion circuit connected to receive said load current for converting three phase currents of said load current into two phase currents;

a second three-phase/two-phase conversion circuit connected to receive said system voltage for converting three phase voltages of said system voltage into two phase voltages;

a synchronization detection circuit connected to receive said two phase voltages for generating synchronized voltage signals synchronized with the fundamental component of said two phase voltages;

a negative phase sequence power detection circuit connected to receive said two phase currents and said synchronized voltage signals for generating a fundamental harmonic negative phase sequence powers;

a first coefficient circuit for multiplying said fundamental harmonic negative phase sequence powers by a first coefficient to generate negative phase sequence power command values; and a first instantaneous current calculating circuit connected to said negative phase sequence power command values and said synchronized voltage signals for generating said negative phase sequence power command value based on said negative phase sequence power command values and said synchronized voltage signals.

* * * * *